Figure 1:
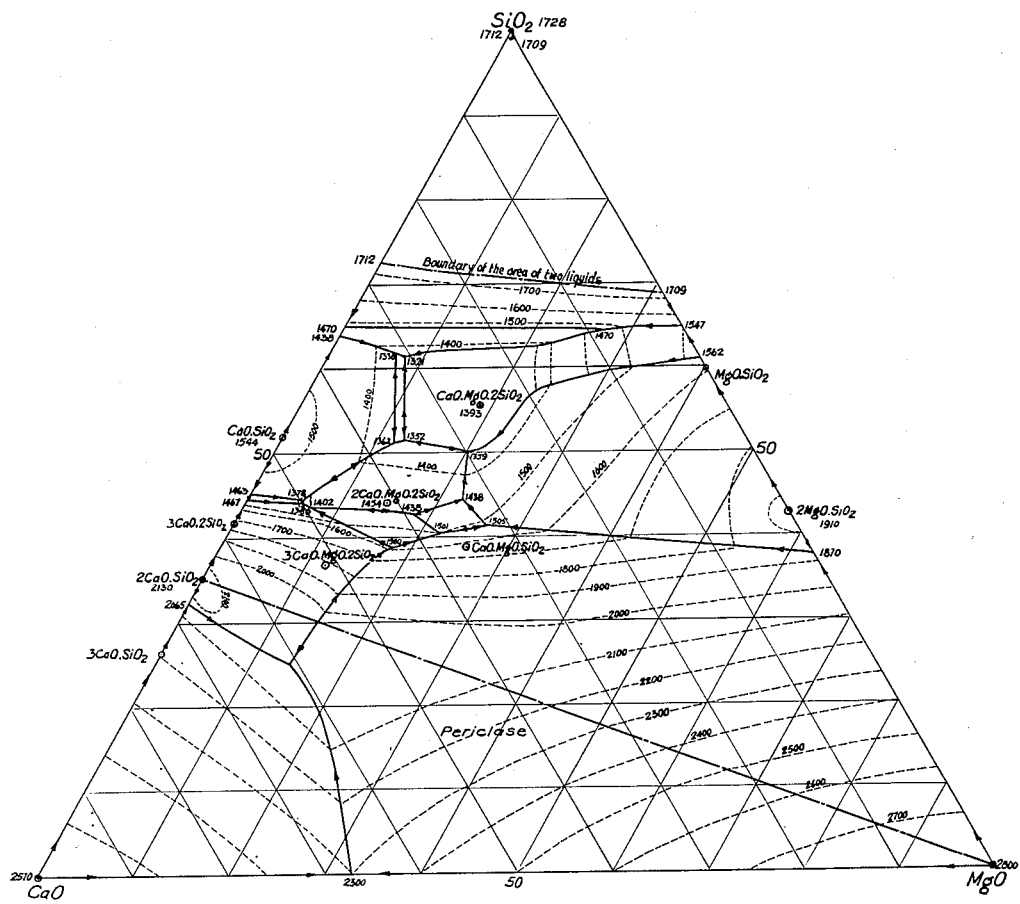

Dec. 9, 1952     F. E. LATHE     2,621,131
METHOD OF CONSOLIDATING REFRACTORY MATERIALS
Filed March 30, 1949     2 SHEETS—SHEET 1

Frank E. Lathe
INVENTOR.

Dec. 9, 1952  F. E. LATHE  2,621,131
METHOD OF CONSOLIDATING REFRACTORY MATERIALS
Filed March 30, 1949  2 SHEETS—SHEET 2

Frank E. Lathe
INVENTOR.

BY *Alex. E. MacRae*

Attorney.

Patented Dec. 9, 1952

2,621,131

UNITED STATES PATENT OFFICE 2,621,131

METHOD OF CONSOLIDATING REFRACTORY MATERIALS

Frank E. Lathe, Ottawa, Ontario, Canada, assignor to Canadian Refractories Limited, Montreal, Quebec, Canada, a corporation of Canada Application March 30, 1949, Serial No. 84,345

23 Claims. (Cl. 106—58)

This invention relates to a method of consolidating granular particles of refractory material, at a temperature lower than heretofore possible, into a highly refractory and mechanically strong or load-bearing product, which consists essentially of lime and silica and for most applications contains a substantial amount of magnesia.

In accordance with the present invention granular particles of refractory material containing at least 80% by weight of lime, magnesia and silica and in which the weight ratio of lime to silica is at least 2.1 are mixed with a relatively non-refractory material, preformed or natural, containing at least 75% by weight of lime, magnesia and silica, of which substantially 42 to 74% is silica, 6 to 58% is lime and the magnesia ranges from 0 as a minimum to a maximum of 33% at 42% silica and 38% at 56% silica, with proportional intermediate percentages. It will be observed from the lime-magnesia-silica phase equilibrium diagram, referred to later, that complete reaction between the above components of non-refractory material in the proportions given leads to the formation of silicates with no magnesia present as periclase. This is essential in order that this non-refractory constituent will form a substantial body of liquid at a temperature of 1500° C. or less. The two constituent materials are mixed in such proportions that the weight ratio of lime to silica in the final mixture is not substantially less than 1.87. The mixture is heated to a temperature higher than that of incipient fusion of the non-refractory portion of the mixture. As the non-refractory material melts the liquid formed reacts with the lime of the refractory constituent to form dicalcium or tricalcium silicate both of which fuse only at much higher temperatures. As heating is continued all of the non-refractory component is eliminated by reaction with the refractory granular material to bond all the granules together in a load-bearing product which softens only at a very high temperature.

A characteristic of mixtures of the type coming within the scope of this invention is that when exposed to temperatures at or above the melting point of the non-refractory constituent they first become pasty, as this constituent melts, and then stiffen up as the reaction proceeds with the refractory granules; eventually the whole mass becomes quite hard. Within wide limits, the higher the temperature used, the harder will be the product, the reason being that progress towards ultimate equilibrium is more rapid and more nearly complete at the higher temperature.

The non-refractory constituent may be preformed by any suitable method. Complete fusion can readily be brought about by heating raw materials of the desired over-all composition and physical character in water jacketed blast furnaces (when coarse) or in reverberatory or electric furnaces (whether coarse or fine). Fusion can, if desired, be brought about in rotary kilns, but when these are used it is customary to carry out the operation at such a temperature that sintering, shrinkage and nodulization of the fine charge occur without complete fusion. In such a case the reaction does not usually proceed to complete equilibrium but sufficient liquid is formed to act as a strong bond upon cooling. After cooling, the clinkered product is crushed to the desired grain size for use as a non-refractory constituent in the bonding of refractory granular material.

It has been found that best results are obtained when the non-refractory constituent is substantially of a grain size within the range 6 to 20 mesh. When the material is coarser, drainage of the non-refractory constituent prior to reaction with the granular refractory is more likely to occur; when it is too fine (especially if fine material also occurs in the refractory constituent) the reaction may take place so rapidly that insufficient liquid exists at any one time to shrink the particles properly and bond them strongly together. Thus the use of very fine material may result in a product which, while equally refractory, is relatively soft, and hence not satisfactory with respect to mechanical strength. The use of fine particles of non-refractory constituent is not objectionable when fines have been removed from the refractory portion.

Since the invention comprises a method of consolidating granular particles of refractory material, it follows that this material must not be wholly fine. There is, however, a considerable range of particle size which gives good results. For example, fettling materials sometimes consist of at least 50% by weight of particles coarser than ¼″, whereas in manufacturing brick it is customary to crush the raw materials until substantially all particles are below ¼″, or in some cases even below $\frac{1}{16}$″. Refractory materials to be bonded should contain at least 50% by weight of grains coarser than 20 mesh.

The operation of the invention is illustrated by the following particular examples and will be best understood by reference to the accompanying drawings in which, Figure 1 is a simplified form of the phase equilibrium diagram of the ternary system lime-magnesia-silica, published by United States Steel Corporation, revised edition October 1945.

Figure 2:
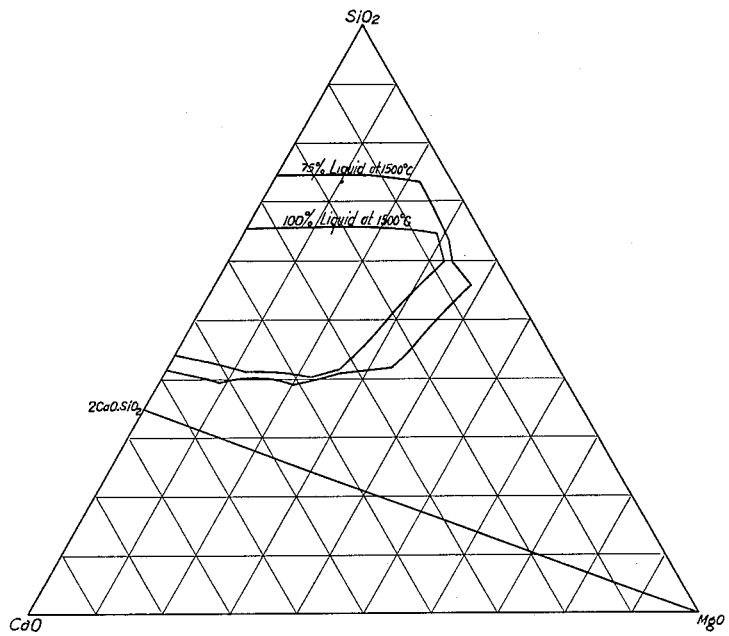
Figure 3:
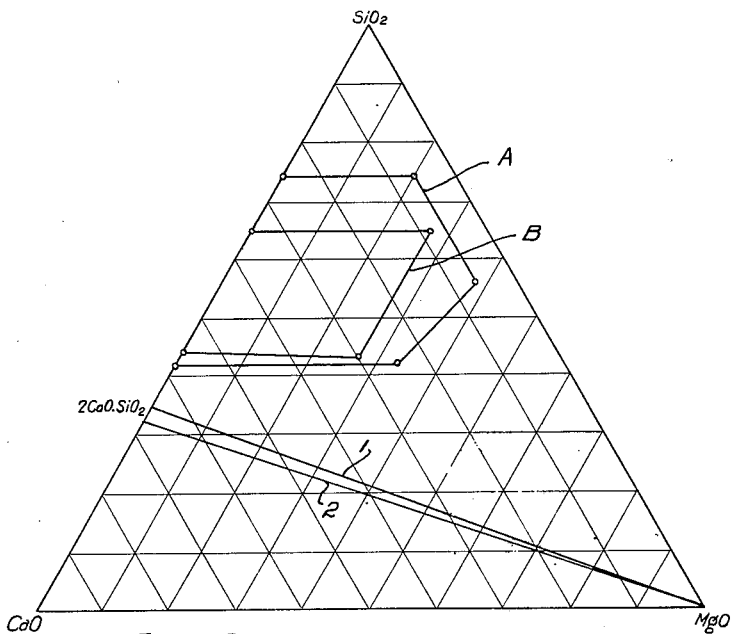

Figure 2 shows, for the same system, the ranges of compositions of the non-refractory material of the invention which are (1) 100% and (2) 75% liquid at 1500°, and Figure 3 particularly designates on the diagram the limits of the non-refractory material specifically defined herein and also the limits of composition of the refractory granular particles to be bonded.

These drawings facilitate a ready understanding of the scope of the invention. It will be observed (a) that the composition of the refractory granular material, on the basis of its content of lime magnesia and silica only, has a lime to silica ratio of at least 2.1, as shown by line 2, Figure 3, and lies appreciably below the

2CaO.SiO$_2$—MgO join line 1 on the diagram, and accordingly has excess lime above the orthosilicate ratio to combine with the excess silica of the non-refractory material and (b) that the non-refractory material used to consolidate the refractory granules lies substantially within the pentagonal area A shown in Figure 3 and preferably within the quadrilateral area B.

*Example 1*

A laboratory furnace is to be lined with electrically fused lime, rammed in place and bonded with a minimum quantity of calcium silicate. Ten percent of bond will be used, as this is about the minimum necessary to give the required strength of bond in this case. There is first formed by the fusion of suitable calcareous and siliceous materials a lime-silica eutectic containing 54.8 lime and 45.2% silica and melting at 1463° C. The solidified product is crushed to about 10 mesh and 10 parts of this are intimately mixed with 90 parts of electrically fused lime, which may conveniently be minus 4 plus 40 mesh, and, using any suitable binder as a temporary bond, the whole is rammed into place as a furnace lining. When the mass is heated, the non-refractory constituent melts at 1463° C. and subsequently reacts with the free lime, eventually forming a solid refractory mass containing about 17.2% tricalcium silicate and 82.8% free lime, which can then form no liquid until a temperature of 2065° C. is reached. The chemical composition of the mass is 95.5 lime and 4.5% silica. In this and succeeding examples it is a wise precaution to add a stabilizing agent for dicalcium silicate, should any be formed.

*Example 2*

Again using electrically fused lime, and with the bonding material limited to 15% by weight, one is required to carry out the bonding operation at 1500° C. and to form in the product a maximum proportion of tricalcium silicate. It is obviously desirable to use a non-refractory constituent as siliceous as possible, and one reacts together 26 parts of pure lime and 74 parts of pure silica. Liquid begins to form at 1438° C., and at 1500° C. 75% of the material is molten and the reaction is substantially complete. The cooled product is crushed to about 6 mesh, and 15 parts of it are mixed with 85 parts of the fused lime of suitable grain size and molded to the desired form. Upon heating to 1500° C. about 11% (75% of 15%) of liquid is formed. When chemical equilibrium is reached, through reaction of the refractory and non-refractory constituents, the mass consists of about 57.8% by weight of free lime and 42.2% of tricalcium silicate.

*Example 3*

Using a chemical method there has been prepared from high-grade dolomite a material which when dead-burned contains 83 magnesia, 10 lime, 2 silica and 5% ferric oxide, and is in granular form. It is desired to use this in the manufacture of brick which will consist essentially of periclase bonded with dicalcium silicate and magnesium ferrite, with the maximum content of periclase. The highest available burning temperature is 1500° C. In order to provide sufficient liquid at this temperature to form a brick of high strength, there is used a non-refractory constituent of relatively low silica content, and for this purpose one makes, by any suitable means, a "slag" containing essentially 30 lime, 27 magnesia and 43% silica, and forming substantially 100% liquid at 1500° C., with a large amount of liquid even as low as 1450° C. This is granulated in water, and the product consists mostly of particles between 10 and 28 mesh, 12.5 parts of which are used to bond 100 parts of the refractory crushed to 6 mesh and sized to produce a brick of high density. The mixture (to which a stabilizing agent for dicalcium silicate is preferably added) is formed into a brick in the usual manner, is dried, and then burned at 1500° C. The non-refractory constituent melts and then reacts rapidly with the lime of the refractory granules, bonding them strongly together. The ultimate mineralogical composition—which may not be attained except at a still higher temperature, as in service—then consists of substantially 75.7 periclase, 18.8 dicalcium silicate and 5.5% magnesium ferrite. All of these constituents are highly refractory, and the combination is rendered still more so by the fact that the magnesium ferrite enters the periclase in solid solution. The temperature of failure of such brick under a load of 50 lbs. per square inch is about 1700° C., whereas a brick from the original material, even did it possess adequate mechanical strength, would have failed at about 1500° C., owing to the lack of a refractory bond for the cubical periclase crystals.

*Example 4*

So-called "double-burned dolomite" has been extensively used in fettling the banks of open hearth steel furnaces, but its greatest weakness is the difficulty in setting it, since when pure it forms no liquid below about 2300° C. In an effort to overcome this difficulty, some manufacturers incorporate in the burned dolomite about 12% of dicalcium ferrite, but this step is by no means a satisfactory solution, since in a steel furnace this melts and enters the slag without imparting any permanent set to the dolomite particles. The problem may therefore be stated as the introduction of about 12% of non-refractory material, which will melt at a temperature as low as dicalcium ferrite (which melts incongruously at about 1440° C.), but will subsequently react with the lime of the dolomite and bond it together to a refractory mass that will form little or no liquid even at the highest temperature of the open hearth furnace—about 1650° C. One first forms, by melting together siliceous dolomite (a waste product), sandstone and calcium carbonate in suitable proportions, a "slag" containing 30.5 lime, 8 magnesia and 61.5% silica, which is the composition of the eutectic melting at 1321° C. This is granulated in water and then mixed with dolomite (burned without iron oxide and of the desired grain size) in proportions 12 and 88 parts. When used in patching the eroded banks of a hot open hearth furnace, the mixed material forms 12% of liquid at 1321° C. This liquid is absorbed by the dolomite, with which it chemically reacts, forming dicalcium silicate (or tricalcium silicate) and periclase, and the dolomite is so firmly bonded that it offers great resistance to mechanical erosion, in striking contrast to the straight burned dolomite or dolomite made with dicalcium ferrite. Further, it is less permeable to the furnace slag, and forms by itself no liquid below 2000° C. While the introduction of silica might appear objectionable, the amount introduced is only about 7.4%, and any dicalcium silicate formed is highly resistant to chemical attack by the open hearth slag. The overall advantages are therefore very great.

*Example 5*

A commercial refractory containing 63% magnesia as periclase, 22 lime, 7 silica, 7 ferric oxide and 1% alumina, which is frequently burned in place in "permanent" furnace hearths at normal operating temperatures of 1550–1650° C. but at a relatively slow rate, is to be bonded as rapidly as possible by a material of such composition that a relatively small quantity will have to be used, and that the periclase content of the ultimate refractory will be reduced by the minimum amount. A non-refractory material high in silica and relatively high in magnesia and low in lime is desirable. A satisfactory composition is 64 silica, 27 magnesia and 9% lime; serpentine, dolomite and sandstone in suitable proportions are heated to at least incipient fusion in a rotary kiln. When 8 parts of the sintered product, preferably minus 8 plus 20 mesh, are used to bond 100 parts of granular refractory, fusion of the former begins at about 1400° C. and substantially complete liquidity is reached at 1500° C., and immediate bonding results. The ultimate chemical composition is 60.3 magnesia, 21.0 lime, 11.2 silica, 6.6 ferric oxide and 0.9% alumina, and when the reaction has gone to completion the mineralogical composition will be substantially 58.3 periclase, 32.2 dicalcium silicate, 8.25 magnesium ferrite and 1.25% magnesium aluminate. All of these compounds are highly refractory. Not only has bonding been carried out at a lower temperature and in a much shorter time, but the refractoriness of the final product has been substantially raised, and the furnace bottom formed of it gives much better service. While such hearths are frequently formed by burning in thin layers one at a time, it may be pointed out that the materials in question could equally well be used for rammed furnace hearths, the difference being mostly in the method of applying the refractory.

*Example 6*

From a brucitic mineral deposit, low in silica, there has been prepared by electrical fusion a material carrying substantially 94 magnesia and 6% lime, and it is necessary to form this into brick with the very minimum quantity of non-refractory material and produce by reaction an ultimate refractory as low as possible in lime. For this purpose a melt is prepared containing 74 silica, 6 lime and 20% magnesia; substantially 75% of this is liquid at 1500° C. From the molten condition it is poured into water and the product is dried. The refractory constituent is crushed to pass 8 mesh and the fines are retained. To 100 parts of it 4.54 parts of granulated non-refractory constituent are added and the whole is molded to the desired form and burned at 1550° C., preferably with the addition of a very little boric acid as a stabilizing agent for the dicalcium silicate to be formed. Neglecting the boric acid, the brick ultimately consists of 90.8 parts of periclase and 9.2 parts of dicalcium silicate.

The same composition in the ultimate product could have been secured under the same conditions by using 6.09 parts of non-refractory constituent containing 56 silica, 6 lime and 38% magnesia which is substantially 75% liquid at 1500° C.

By using only 3.98 parts of the second of these non-refractory materials, one would by the same method obtain a final product consisting of 91.85% periclase and 8.15% tricalcium silicate.

*Example 7*

In some plants, raw dolomite is used instead of double-burned dolomite in fettling the banks of open hearth steel furnaces. It is not expected to furnish more than temporary protection to the banks, since it does not set to even a small degree at the highest furnace temperature, and it has, in fact, to be replaced after every heat. A major improvement in the practice of using raw dolomite alone is effected by preforming, as in Example 4, a melt containing 30.5 lime, 8.0 magnesia and 61.5% silica, and granulating this in water. Ten parts of the granulated material are then mixed with 90 parts of raw granular dolomite of a suitable grain size (about minus 2 plus 8 mesh) and the whole is thrown on the hot banks of an open hearth furnace immediately after tapping. By the time the material reaches a temperature of 1000° C. it has lost all its carbon dioxide, and the calcined dolomite is then present as soft granules. When the preformed material melts, at 1321° C. the liquid is immediately absorbed by the porous and highly reactive granules. The mass shrinks very considerably, and is largely converted into highly refractory and slag-resistant periclase and dicalcium silicate (at ultimate equilibrium, tricalcium silicate). In this case the amount of calcium silicate constitutes a considerably greater proportion of the total mass than in Example 4, since pure dolomite loses about 48% by weight on calcination. The higher proportion of liquid is desirable because of the porosity of the calcined dolomite as compared with the double-burned product.

*Example 8*

It is desired to make use of natural minerals or rocks as non-refractory constituents in combination with dolomite, instead of preforming slags for bonding purposes. Compounds of lime and silica (with or without magnesia) which may be used are diopside ($CaO.MgO.2SiO_2$), ackermanite ($2CaO.MgO.2SiO_2$), and wollastonite ($CaO.SiO_2$). While the latter, when pure, has a melting point of 1544° C., and is therefore of marginal value for the purpose, it frequently contains enough magnesia, or other impurity, to reduce its melting point to 1500° C. or below; only about 3% of magnesia is required to do this. There are, however, many natural deposits which contain 75–80% of silica plus lime plus magnesia and melt at 1500° C. or below, such as various granites, diabases and diorites. Although these usually contain alumina and other impurities in minor proportion, they have proved satisfactory when the highest refractoriness in the final products was not required, and their use as non-refractory materials is included within the scope of this invention. On the other hand, monticellite (CaO.MgO.SiO$_2$) and merwinite (3CaO.MgO.2SiO$_2$), which are considerably more refractory, are definitely excluded, as are all naturally occurring materials with substantially less than 42% or more than 74% of silica.

The examples given above illustrate the broad scope of the invention and the approximate limits of composition within which good results have been obtained. These limits may be defined as comprising all compositions which, on the basis of their lime, magnesia and silica contents (that is, neglecting minor impurities such as iron oxide and alumina) lie within the boundaries of the rectilinear pentagonal figure A in the lime-magnesia-silica phase equilibrium diagram (Figure 3) defined by corners having compositions (1) 26 lime, 0 magnesia, 74% silica, (2) 6 lime, 20 magnesia, 74% silica, (3) 6 lime, 38 magnesia, 56% silica, (4) 25 lime, 33 magnesia, 42% silica, (5) 58 lime, 0 magnesia, 42% silica. The invention may also be defined as comprising, as the non-refractory constituent, whether naturally occurring or preformed, all combinations of lime, magnesia and silica (with not more than 25% of all other compounds) which are at least substantially 75% molten at 1500° C., (Figure 2). These ranges are practically identical.

A preferred, and somewhat smaller, range of composition is that which, on the same basis, lies within the bounds of the rectilinear quadrilateral B defined by corners having compositions (1) 35 lime, 0 magnesia, 65% silica, (2) 8 lime, 27 magnesia, 65% silica, (3) 30 lime, 27 magnesia, 43% silica, and (4) 56 lime, 0 magnesia and 44% silica, as shown in Figure 3. This quadrilateral approximately defines the limits within which all compositions are substantially 100% liquid at 1500° C. (Figure 2).

For convenience in calculation it has been assumed in several of the examples given above that the non-refractory constituent consisted entirely of the oxides lime, magnesia and silica. It will be appreciated, however, that, when using commercial raw materials, minor amounts of other oxides, such as those of iron, aluminum, titanium and the alkali metals, may be present. The invention is limited, however, to the use of a non-refractory constituent, whether natural or synthetically preformed, which contains at least 75% of lime plus magnesia plus silica.

In none of the preformed non-refractory constituents is the magnesia at equilibrium present as periclase. When they are rapidly cooled from the liquid condition, as by granulation in water, they form a glass, and when slowly solidified they crystallize to various silicates of lime and magnesia, the nature of which is dependent upon the composition of the melt. In no case, however, does the magnesia crystallize as periclase. This is in striking contrast, for example, with the raw material of Seaton and Hartzell, United States Patent 2,218,485, who combined two refractories, the less refractory of which contained "a major portion" (65–90%) "of magnesia" (most of which was present as periclase) "and lesser quantities of silica, lime and alumina." In United States Patent 2,238,428, Seaton and Hartzell disclosed the use of a material which would solidify "with crystallization of the magnesia as periclase." So also Lee United States Patent 2,089,970 dealt with materials consisting largely of periclase. In the present invention, by using magnesia in the combined form in the non-refractory constituent, it has become possible to produce materials which are at least substantially 75% liquid at 1321–1500° C., instead of being only somewhat plastic even at much higher temperatures. While the prior art aimed at the production of highly refractory materials from others of lower refractoriness, the approach to the problem may be said to have been substantially the opposite of that of the present invention, and the result obtained was far less satisfactory.

It is evident from the examples already given that, while the granular particles of refractory material to be bonded always contain a large proportion of oxide constituents in the lime-magnesia-silica system, the presence of iron oxide, alumina and other impurities in minor proportion does not render the bonding method inapplicable. This invention is limited, however, to the bonding of refractory granular materials containing at least 80% by weight on the dead-burned or loss-free basis, of lime plus magnesia plus silica, and having a ratio of lime to silica of at least 2.1.

In regard to the proportions of the non-refractory and refractory constituents to be used in any particular case, it will be observed from the examples given that these may vary widely. In the lime-magnesia-silica system, however, a definite limit exists, and use can be made only of those mixtures of non-refractory and refractory constituents which, in their over-all composition, contain lime and silica in a ratio at least as great as that of calcium orthosilicate, that is, substantially 1.87 or greater on a weight ratio, or at least 2.0 on a molecular basis. Such materials, if pure and fully reacted, form no liquid below a temperature of 2000° C. or, in the absence of magnesia, 2065° C. To those versed in the art, it is a simple arithmetical problem to calculate the proportions of the two materials which will give such a result in any particular case.

It will be readily understood that various specific applications of the method of the invention may be made. Mention has already been made of the production of refractories consisting essentially of (1) free lime and tricalcium silicate, useful for experimental laboratory and other furnaces, (2) periclase, dicalcium silicate and magnesium ferrite in the form of brick, (3) double-burned dolomite plus tricalcium silicate as fettling material for open hearth steel furnaces, (4) permanent steel furnace hearths of periclase, dicalcium silicate, magnesium ferrite and magnesium aluminate, whether bonded in place in relatively thin layers or rammed in as a single unit, (5) brick of periclase and dicalcium silicate and (6) brick of periclase and tricalcium silicate.

The invention, however, is not limited to any particular method of application, but rather to the bonding of granular refractories by the use of siliceous non-refractory materials of the particular type described.

This application is a continuation in part of co-pending application Serial No. 688,264 filed August 3, 1946, now Patent No. 2,568,237.

I claim:

1. A method of consolidating refractory granular particles into a mechanically strong and highly refractory product which comprises mixing refractory granular particles containing, on the burned basis, a total of not less than 80% by weight of lime plus magnesia plus silica, and in which the weight ratio of lime to silica is not less than 2.1, with non-refractory material consisting essentially of a total of not less than 75% by weight of silica plus lime plus magnesia and having a composition falling within the rectilinear pentagonal area A in the lime-magnesia-silica phase equilibrium diagram Figure 3, in such proportions of refractory and non-refractory materials that the weight ratio of lime to silica in the over-all mixture is not substantially less than 1.87, and heating the mixture to a temperature higher than that of incipient fusion of the non-refractory material and not less than 1321° C. to form liquid, and continuing the heat treatment until the liquid chemically reacts with said granular refractory material and consolidates the mass.

2. A method of consolidating into a mechanically strong and refractory product highly refractory granular particles which comprises mixing said granular particles consisting essentially of lime and magnesia in which the weight ratio of lime to any silica present is not less than 2.1 with a non-refractory material having a composition within the range (1) 26 lime, 0 magnesia, 74% silica (2) 6 lime, 20 magnesia, 74% silica, (3) 6 lime, 38 magnesia, 56% silica, (4) 25 lime, 33 magnesia, 42% silica, (5) 58 lime, 0 magnesia, 42% silica as shown in the rectilinear pentagonal area A in the lime-magnesia-silica phase equilibrium diagram Figure 3, in such proportions that the weight ratio of lime to silica in the mixture is not substantially less than 1.87 and heating the mixture to a temperature higher than that of incipient fusion of the non-refractory material and not less than 1321° C. to form liquid, and continuing the heat treatment until the liquid chemically reacts with said granular refractory material and consolidates the mass.

3. A method of consolidating into a mechanically strong refractory product highly refractory granular particles which comprises mixing said granular particles consisting essentially of lime and magnesia in which the weight ratio of lime to silica present is at least 2.1 with a non-refractory material having a composition within the range (1) 35 lime, 0 magnesia, 65% silica, (2) 8 lime, 27 magnesia, 65% silica, (3) 30 lime, 27 magnesia, 43% silica, and (4) 56 lime, 0 magnesia and 44% silica as shown in the quadrilateral B in the lime-magnesia-silica phase equilibrium diagram Figure 3, in such proportions that the weight ratio of lime to silica in the mixture is not substantially less than 1.87 and heating the mixture to a temperature higher than that of incipient fusion of the non-refractory material and not less than 1321° C. to form liquid, and continuing the heat treatment until the liquid chemically reacts with said granular refractory material and consolidates the mass.

4. A method of consolidating into a mechanically strong and refractory product granular particles of dolomite which comprises mixing said particles with a preformed non-refractory material consisting essentially of lime and magnesia in substantially equimolecular ratio and not less than 42 nor more than 74% of silica, in such proportions that the weight ratio of lime to silica in the over-all mixture is not less than 1.87 and heating the mixture at least to incipient fusion of the non-refractory material not less than 1321° C., and continuing the heat treatment until the liquid chemically reacts with said granular refractory material and consolidates the mass.

5. A method as defined in claim 4 wherein the granular dolomite is dead-burned.

6. A method as defined in claim 4 wherein the granular dolomite is unburned.

7. A method as defined in claim 4 wherein the non-refractory material has substantially the composition of diopside.

8. A method as defined in claim 1 wherein the refractory granular particles consist essentially of magnesia with substantially 10 to 22% lime and 2 to 7% silica and in which the weight ratio of lime to silica is at least 2.5.

9. A method as defined in claim 1 wherein the refractory granular particles consist essentially of magnesia with substantially 10 to 22% lime and 2 to 7% silica and in which the weight ratio of lime to silica is at least 2.5, and the non-refractory material has substantially the composition of wollastonite.

10. A method as defined in claim 1 in which the non-refractory constituent becomes substantially 75% molten at 1500° C.

11. A method as defined in claim 1 in which the non-refractory constituent becomes substantially 100% molten at 1500° C.

12. A method as defined in claim 1 in which the non-refractory constituent is of such a grain size that at least 50% of it by weight will pass a screen of 6 meshes to the inch, and be retained on a screen of 20 meshes to the inch.

13. A method as defined in claim 1 wherein at least 50% by weight of the granular refractory particles are coarser than 20 mesh.

14. A method as defined in claim 1 in which the non-refractory constituent is a naturally occurring material.

15. A method as defined in claim 1 in which the non-refractory constituent is preformed by at least incipient fusion.

16. A method as defined in claim 1 in which the non-refractory constituent contains from 1% to 38% of magnesia in combined form and none as periclase.

17. A method as defined in claim 1 in which the ultimate product at chemical equilibrium consists essentially of dicalcium silicate and periclase.

18. A method as defined in claim 1 in which the ultimate product consists essentially of periclase, calcium orthosilicate and a stabilizing agent to prevent inversion and disintegration of the product.

19. A method as defined in claim 1 in which the ultimate product at chemical equilibrium consists essentially of tricalcium silicate and periclase.

20. A method as defined in claim 1 in which the ultimate product at chemical equilibrium contains free lime and tricalcium silicate.

21. A method as defined in claim 1 in which the non-refractory material is fused and granulated in water.

22. A batch material for refractory masses and shapes which comprises an intimate mixture of materials of two types, the first type consisting essentially of basic refractory granular particles consisting essentially of magnesia and not less than 10% by weight of lime and having not less than 6% by weight of lime in excess of that required to form calcium orthosilicate with all the silica in the said granular particles, and the second type consisting of a non-refractory silicate consisting essentially of a total of not less than 75% by weight of silica, lime and magnesia, and having a composition falling within the rectilinear pentagonal area A in the lime-magnesia-silica phase equilibrium diagram Figure 3, the weight ratio of lime to silica in the said intimate mixture being not substantially less than 1.87.

23. A batch material for refractory masses and shapes which comprises an intimate mixture of materials of two types, the first type consisting essentially of basic refractory granular particles consisting essentially of magnesia and not less than 10% by weight of lime and having not less than 6% by weight of lime in excess of that required to form calcium orthosilicate with all the silica in the said granular particles, and the second type consisting of a non-refractory silicate consisting essentially of a total of not less than 75% by weight of silica, lime and magnesia, and having a composition falling within the quadrilateral area B in the lime-magnesia-silica phase equilibrium diagram Figure 3, the weight ratio of lime to silica in the said intimate mixture being not substantially less than 1.87.

FRANK E. LATHE.

REFERENCES CITED

The following references are of record in the file of this patent:

UNITED STATES PATENTS

| Number | Name | Date |
|---|---|---|
| 1,300,631 | Meyer | Apr. 15, 1919 |
| 1,483,469 | Meyer | Feb. 12, 1924 |
| 1,751,234 | Garnett | Mar. 18, 1930 |
| 2,245,297 | Pitt et al. | June 10, 1941 |
| 2,358,107 | Seil | Sept. 12, 1944 |

FOREIGN PATENTS

| Number | Country | Date |
|---|---|---|
| 396,532 | Great Britain | 1933 |

OTHER REFERENCES

Glass Industry, March 1935, page 84.